US012664231B2

(12) United States Patent
Cheng et al.

(10) Patent No.: US 12,664,231 B2
(45) Date of Patent: Jun. 23, 2026

(54) METHOD FOR ACCELERATING FAST FOURIER TRANSFORM BASED ON FIELD PROGRAMMABLE GATE ARRAY

(71) Applicants:HangZhou DianZi University, Hangzhou City (CN); HDU Fuyang Electronic Information Research Institute Co., Ltd., Hangzhou (CN)

(72) Inventors: Zhiqun Cheng, Hangzhou (CN); Yiteng Pan, Hangzhou (CN); Chao Le, Hangzhou (CN)

(73) Assignees: HangZhou DianZi University, Hangzhou City (CN); HDU Fuyang Electronic Information Research Institute Co., Ltd., Hangzhou City (CN)

( * ) Notice: Subject to any disclaimer, the term of this patent is extended or adjusted under 35 U.S.C. 154(b) by 933 days.

(21) Appl. No.: 17/959,628

(22) Filed: Oct. 4, 2022

(65) Prior Publication Data

US 2023/0237121 A1 Jul. 27, 2023

(30) Foreign Application Priority Data

Jan. 24, 2022 (CN) .......................... 202210080227.6

(51) Int. Cl.
*G06F 17/14* (2006.01)
(52) U.S. Cl.
CPC .......... *G06F 17/141* (2013.01); *G06F 17/142* (2013.01)
(58) Field of Classification Search
CPC .............................................. G06F 17/14–142
See application file for complete search history.

(56) References Cited

U.S. PATENT DOCUMENTS

| | | | | |
|---|---|---|---|---|
| 2008/0307026 A1* | 12/2008 | Cho | ...................... | G06F 17/142 |
| | | | | 708/404 |
| 2009/0135928 A1* | 5/2009 | Jang | ...................... | G06F 17/142 |
| | | | | 708/209 |
| 2014/0280420 A1* | 9/2014 | Khan | .................... | G06F 9/3897 |
| | | | | 708/404 |

FOREIGN PATENT DOCUMENTS

| | | | | | | |
|---|---|---|---|---|---|---|
| CN | 108021781 A | * | 5/2018 | .......... | G06F 30/392 |
| CN | 110647719 A | * | 1/2020 | .......... | G06F 17/142 |
| CN | 115455348 A | * | 12/2022 | .......... | G06F 17/142 |

OTHER PUBLICATIONS

Polat, Gokhan, Sitki Ozturk, and Mehmet Yakut. "Design and implementation of 256-point radix-4 100 Gbit/s FFT algorithm into FPGA for high-speed applications." ETRI Journal 37.4 (2015): 667-676. (Year: 2015).*

* cited by examiner

*Primary Examiner* — Matthew D Sandifer
(74) *Attorney, Agent, or Firm* — Gearhart Law, LLC

(57) ABSTRACT

A method for accelerating fast Fourier transform (FFT) based on field programmable gate array is provided. A sequence requiring N-point FFT is decomposed equally into 4 subsequences. The 4 subsequences are processed through 4 parallel FFT intellectual property (IP) cores. Finally, an arithmetic operation is performed on the processed data and twiddle factor data pre-stored in a memory to obtain a result of the N-point FFT of an original sequence. An FFT decomposition module, a twiddle factor storage module, and an operation processing module are provided. Through the processing method, a time delay consumed by an N-point FFT operation can be reduced, and excellent application value can be achieved in a high-speed digital signal processing system.

3 Claims, 2 Drawing Sheets

METHOD FOR ACCELERATING FAST FOURIER TRANSFORM BASED ON FIELD PROGRAMMABLE GATE ARRAY

CROSS REFERENCE TO RELATED APPLICATION

This patent application claims the benefit and priority of Chinese Patent Application No. 202210080227.6, entitled "METHOD FOR ACCELERATING FAST FOURIER TRANSFORM BASED ON FIELD PROGRAMMABLE GATE ARRAY" filed on Jan. 24, 2022, the disclosure of which is incorporated by reference herein in its entirety as part of the present application.

TECHNICAL FIELD

The present disclosure belongs to the field of digital signal processing, and relates to a method for accelerating fast Fourier transform based on field programmable gate array (FPGA).

BACKGROUND ART

Fast Fourier transform (FFT), as the most basic signal processing and analysis tool in digital signal processing, may transform a signal from a time domain to a frequency domain, and is widely used in communications and image processing. However, at present, as the demand for data continues to increase, the problem of long time delay brought by an FFT intellectual property (IP) core provided by an FPGA makes it impossible to meet application requirements in a high-speed system. Taking a high-speed communication system as an example, in an in-phase quadrature (IQ) imbalance and channel estimation module, no matter an estimation of frequency-domain equalization with a time domain or an estimation of time-domain equalization with a frequency domain, the FFT IP core is required for auxiliary calculation. When an estimated parameter value is converged in an iterative manner in the high-speed system, the problem of long time delay in the FFT IP core causes calculated data to be covered, which in turn affects the performance of the system.

Therefore, in view of the defects in the conventional art, it is necessary to provide a method for accelerating fast Fourier transform based on FPGA, so as to solve the problem of long time delay in the conventional art.

SUMMARY

The present disclosure provides a method for accelerating fast Fourier transform based on FPGA. An FFT decomposition module, a twiddle factor storage module, and an operation processing module are provided, an FFT is decomposed into four FFT submodules for processing, and four parallel data are processed in a deep pipeline architecture according to four formulas, thereby greatly reducing a time delay of operation.

To solve problems existing in the conventional art, technical solutions of the present disclosure are as follows:

A method for accelerating fast Fourier transform based on FPGA is provided. The FPGA is internally provided with an FFT decomposition module, a twiddle factor storage module, and an operation processing module. The method includes:

step S1: decomposing, by the FFT decomposition module, an input sequence having a length of N into 4 subse-quences having a length of N/4, and synchronously performing N/4-point FFT;

step S2: outputting, by the twiddle factor storage module, pre-stored twiddle factor data by determining an external input signal for performing arithmetic operation; and step S3: processing, by the operation processing module, data output by the FFT decomposition module and the twiddle factor storage module to obtain a result of N-point FFT of an original sequence;

where, the FFT decomposition module includes a sequence decomposition module and four parallel N/4-point FFT submodules, where the N/4-point FFT submodules of the FFT decomposition module are FFT intellectual property (IP) cores provided by the FPGA, and an output mode of the FFT IP cores of the FFT decomposition module is sequential output; the twiddle factor storage module includes two control units respectively marked as ctr1 and ctr2, and three independent single-port block random access memories (BRAMs) respectively configured to store three different types of twiddle factor data; the three independent single-port BRAMs included in the twiddle factor storage module respectively have a depth of N/4 and are respectively marked as BRAM1, BRAM2, and BRAM3; and corresponding twiddle factor data stored in the three independent single-port BRAMs are as follows:

$$WN1 = e^{-j\frac{2\pi}{N}k}k = 0, 1 \dots, \frac{N}{4} - 1; \tag{1}$$

$$WN2 = e^{-j\frac{2\pi}{N}k}k = \frac{N}{4}, \frac{N}{4} + 1, \dots, \frac{N}{2} - 1; \tag{2}$$

and $$WN3 = e^{-j\frac{2\pi}{N/2}k}k = 0, 1 \dots \frac{N}{4} - 1; \tag{3}$$

where, the step S1 further includes:

substep S11: upon determining that a signal fft_valid==1, decomposing the input sequence x(n) having the length of N into the 4 subsequences, x(m), x(m+2), x(m+1), and x(m+3), each having the length of N/4, where n=0, 1, . . . , N−1, and m=0, 1, . . . , N/4−1;

substep S12: transforming the 4 subsequences x(m), x(m+2), x(m+1), and x(m+3) through four parallel N/4-point FFT IP cores respectively, to obtain 4 output sequences $z_1(m)$, $z_2(m)$, $z_3(m)$, and $Z_4(m)$, where m=0, 1, . . . , N/4−1; $z_1(m)$ corresponds to an output of x(m), $z_2(m)$ corresponds to an output of x(m+2), $z_3(m)$ corresponds to an output of x(m+1), and $z_4(m)$ corresponds to an output of x(m+3); and substep S13: outputting synchronously a data valid signal data1_valid to the twiddle factor storage module while outputting the sequences $z_1(m)$, $z_2(m)$, $z_3(m)$, and $z_4(m)$, which is valid at a high level.

The step S2 further includes:

substep S21: sequentially storing twiddle factors shown in formula (1), formula (2), and formula (3) into three independent memory cells BRAM1, BRAM2, and BRAM3 in a binary form according to an increasing order of k values;

substep S22: when the control unit ctr1 determines that the signal data1_valid==1, generating a read enable signal rd1 and a read address counter addr1 of BRAM3, sequentially acquiring the twiddle factor data of WN3, and transmitting the twiddle factor data of WN3 to the operation processing module; and substep S23: when the control unit ctr2 determines that a signal data2_valid==1, generating a read enable signal rd2 and a read address counter addr2 of BRAM1 and BRAM2, sequentially acquiring the twiddle factor data of WN1 and WN2, and transmitting the twiddle factor data of WN1 and WN2 to the operation processing module.

The step S3 further includes:

substep S31: performing a delay beating on the sequences $z_2(m)$ and $z_4(m)$ to wait for the twiddle factor data of WN3; and multiplying the sequences $z_2(m)$ and $z_4(m)$ by the twiddle factor data of WN3 in sequence in a pipeline architecture to obtain sequences $z_{21}(m)$ and $z_{41}(m)$ having a length of N/4, where m=0, 1, . . . , N/4−1;

substep S32: performing the delay beating on the sequences $z_1(m)$ and $z_3(m)$ to wait for $z_{21}(m)$ and $z_{41}(m)$; adding $z_1(m)$ and $z_{21}(m)$ in sequence in the pipeline architecture to obtain a sequence $Z_1(m)$ having a length of N/4, where m=0, 1, . . . , N/4−1; performing a subtraction operation on $z_1(m)$ and $z_{21}(m)$ in sequence in the pipeline architecture, by subtracting $z_{21}(m)$ from $z_1(m)$ to obtain a sequence $Z_2(m)$ having a length of N/4, where m=0, 1, . . . , N/4−1; adding $z_3(m)$ and $z_{41}(m)$ in sequence in the pipeline architecture to obtain a sequence $z_3(m)$ having a length of N/4, where m=0, 1, . . . , N/4−1; and performing a subtraction operation on $z_3(m)$ and $z_{41}(m)$ in sequence in the pipeline architecture, by subtracting $z_{41}(m)$ from $z_3(m)$ to obtain a sequence $Z_4(m)$ having a length of N/4, where m=0, 1, . . . , N/4−1;

substep S33: outputting synchronously a data valid signal data2_valid to the twiddle factor storage module while obtaining $Z_3(m)$ and $Z_4(m)$, which is valid at a high level;

substep S34: performing the delay beating on the sequences $Z_3(m)$ and $Z_4(m)$ to wait for the twiddle factor data of WN1 and the twiddle factor data of WN2; multiplying the sequence $Z_3(m)$ and the twiddle factor data of WN1 in sequence in the pipeline architecture to obtain a sequence $Z_{31}(m)$ having a length of N/4, where m=0, 1, . . . , N/4−1; and multiplying the sequence $Z_4(m)$ and the twiddle factor data of WN2 in sequence in the pipeline architecture to obtain a sequence $Z_{41}(m)$ having a length of N/4, where m=0, 1, . . . , N/4−1;

substep S35: performing the delay beating on the sequences $Z_1(m)$ and $Z_2(m)$ to wait for $Z_{31}(m)$ and $Z_{41}(m)$; adding the sequences $Z_1(m)$ and $Z_{31}(m)$ in sequence in the pipeline architecture to obtain a sequence $y_1(n)$ having a length of N/4, where n=0, 1, . . . , N/4−1; adding the sequences $Z_2(m)$ and $Z_{41}(m)$ in sequence in the pipeline architecture to obtain a sequence $y_2(n)$ having a length of N/4, where n=0, 1, . . . , N/4−1; performing a subtraction operation on the sequences $Z_1(m)$ and $Z_{31}(m)$ in sequence in the pipeline architecture, by subtracting $Z_{31}(m)$ from $Z_1(m)$ to obtain a sequence $y_3$ (n) having a length of N/4, where n=0, 1, . . . , N/4−1; and performing a subtraction operation on the sequences $Z_2(m)$ and $Z_{41}$ (m) in sequence in the pipeline architecture, by subtracting $Z_{41}(m)$ from $Z_2(m)$ to obtain a sequence $y_4$ (n) having a length of N/4, where n=0, 1, . . . , N/4−1; and substep S36: outputting synchronously a data valid signal dout_valid while outputting $y_1(m)$, $y_2(m)$, $y_3(m)$, and $y_4(m)$, which is valid at a high level.

Compared with the conventional art, the present disclosure has the following technical effects:

The FFT decomposition module, the twiddle factor storage module, and the operation processing module are provided, the FFT is decomposed into four FFT submodules for processing, and four channels of parallel data are processed in a deep pipeline architecture according to four formulas, thereby greatly reducing the time delay of the operation.

The present disclosure is further described below with reference to the following specific embodiments and the above accompanying drawings.

DETAILED DESCRIPTION OF THE EMBODIMENTS

Figure 1:
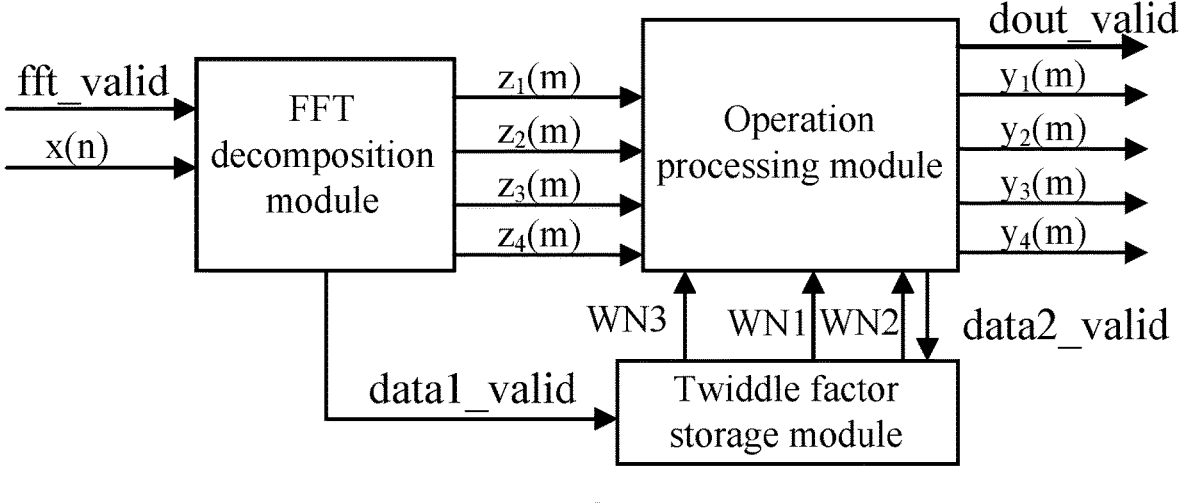
FIG. 1 is an overall schematic diagram of a method for accelerating fast Fourier transform based on FPGA according to the present disclosure.
Figure 2:
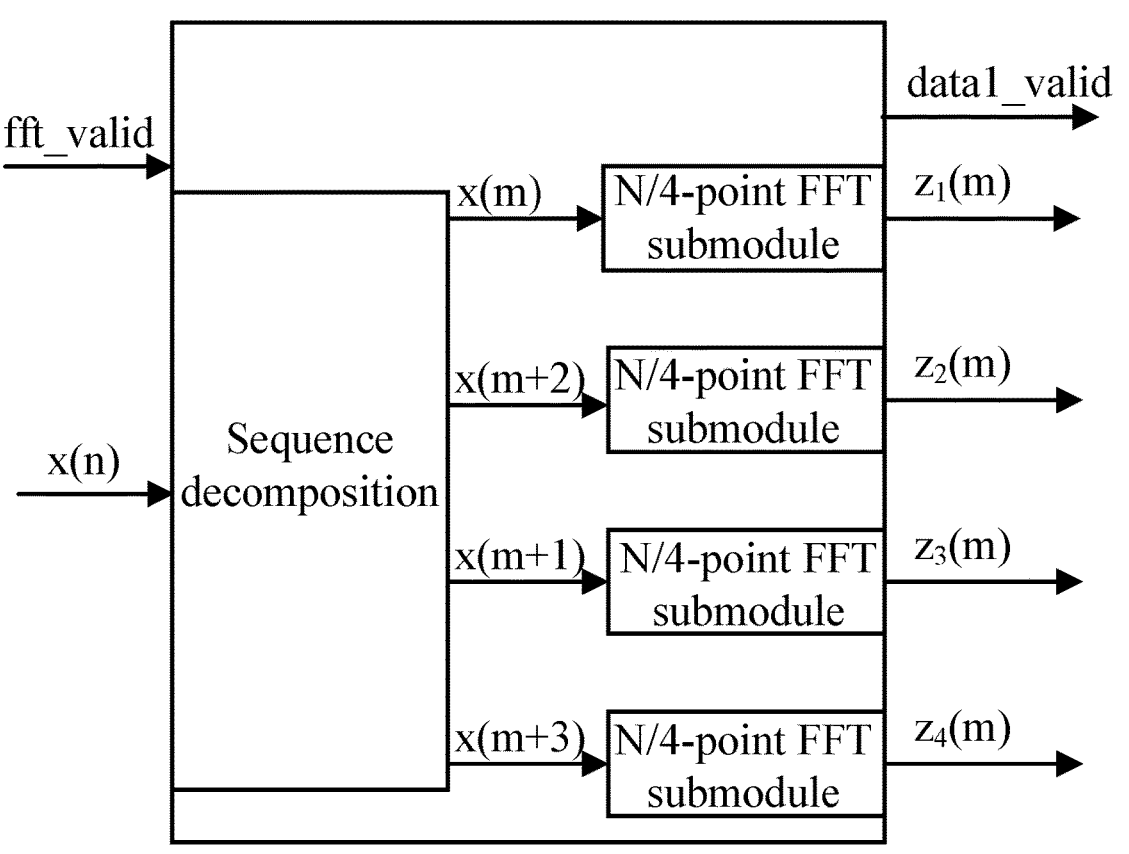
FIG. 2 is a schematic diagram of an FFT decomposition module according to the present disclosure.
Figure 3:
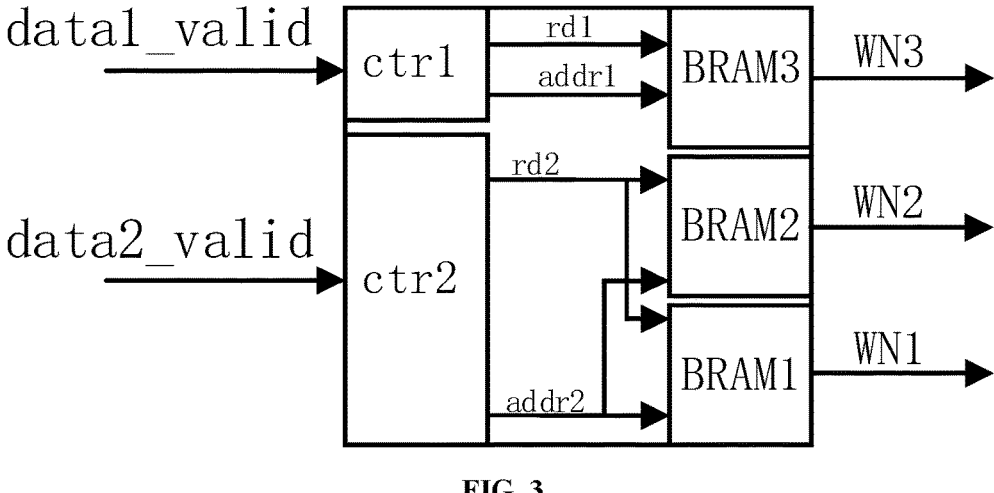
FIG. 3 is a schematic diagram of a twiddle factor storage module according to the present disclosure.

Specific implementations of the present disclosure are described below in detail with reference to the accompanying drawings:

FIG. 1 is an overall schematic diagram of a method for accelerating fast Fourier transform based on FPGA according to the present disclosure. An FFT decomposition module, a twiddle factor storage module, and an operation processing module are provided. FIG. 2 is a schematic diagram of the FFT decomposition module according to the present disclosure. The FFT decomposition module includes a sequence decomposition module and four parallel N/4-point FFT submodules. The N/4-point FFT submodules of the FFT decomposition module are FFT intellectual property (IP) cores provided by the FPGA, and an output mode of the FFT IP cores of the FFT decomposition module is sequential output. FIG. 3 is a schematic diagram of the twiddle factor storage module according to the present disclosure. The twiddle factor storage module includes two control units respectively marked as ctr1 and ctr 2, and three independent single-port block random access memories (BRAMs) respectively configured to store three different types of twiddle factor data; the three independent single-port BRAMs included in the twiddle factor storage module respectively have a depth of N/4 and are respectively marked as BRAM1, BRAM2, and BRAM3. Corresponding twiddle factor data stored in the three independent single-port BRAMs are as follows:

$$WN1 = e^{-j\frac{2\pi}{N}k} \, k = 0, 1 \ldots , \frac{N}{4} - 1; \tag{1}$$

$$WN2 = e^{-j\frac{2\pi}{N}k} \, k = \frac{N}{4}, \frac{N}{4} + 1, \ldots , \frac{N}{2} - 1; \tag{2}$$

and $$WN3 = e^{-j\frac{2\pi}{N/2}k} \, k = 0, 1 \ldots \frac{N}{4} - 1; \tag{3}$$

The specific implementation of the present disclosure includes steps S1-S3.

Step S1: the FFT decomposition module decomposes an input sequence having a length of N into 4 subsequences having a length of N/4, and N/4 point FFT is synchronously performed.

Step S2: the twiddle factor storage module outputs pre-stored twiddle factor data by determining an external input signal for performing arithmetic operation; and Step S3: the operation processing module processes data output by the FFT decomposition module and the twiddle factor storage module to obtain a result of N-point FFT of an original sequence.

FIG. 2 is a schematic diagram of the FFT decomposition module according to the present disclosure. The step S1 further includes substeps S11-S13.

Substep S11: upon determining that a signal fft_valid==1, the input sequence x (n) having the length of N is decomposed into the 4 subsequences, x(m), x(m+2), x(m+1), and x(m+3), each having the length of N/4, where n=0, 1, . . . , N−1, and m=0, 1, . . . , N/4−1.

Substep S12: the 4 subsequences x(m), x(m+2), x(m+1), and x(m+3) are transformed through four parallel N/4-point FFT IP cores to obtain 4 output sequences $z_1(m)$, $z_2(m)$, $z_3(m)$, and $Z_4(m)$, where m=0, 1, . . . , N/4−1; $z_1(m)$ corresponds to an output of x(m), $z_2(m)$ corresponds to an output of x(m+2), $z_3(m)$ corresponds to an output of x(m+1), and $z_4(m)$ corresponds to an output of x(m+3).

Substep S13: a data valid signal data1_valid is output synchronously to the twiddle factor storage module while the sequences $z_1(m)$, $z_2(m)$, $z_3(m)$, and $z_4(m)$ are output, which is valid at a high level.

FIG. 3 is a schematic diagram of the twiddle factor storage module according to the present disclosure. The step S2 further includes substeps S21-S23.

Substep S21: twiddle factors shown in formula (1), formula (2), and formula (3) are sequentially stored into three independent memory cells BRAM1, BRAM2, and BRAM3 in a binary form according to an increasing order of k values.

Substep S22: when the control unit ctr1 determines that the signal data1_valid==1, a read enable signal rd1 and a read address counter addr1 of BRAM3 are generated, twiddle factor data of WN3 are acquired sequentially and transmitted to the operation processing module.

Substep S23: when the control unit ctr2 determines that a signal data2_valid==1, a read enable signal rd2 and a read address counter addr2 of BRAM1 and BRAM2 are generated, twiddle factor data of WN1 and WN2 are acquired sequentially and transmitted to the operation processing module.

Figure 4:
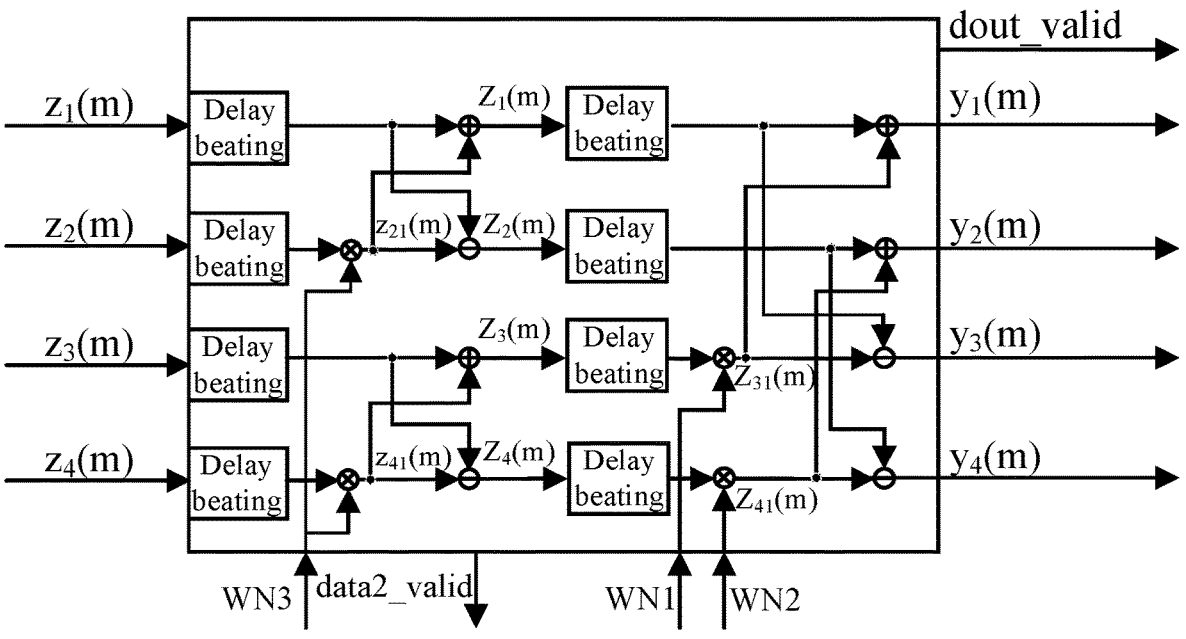
FIG. 4 is a schematic diagram of an operation processing module according to the present disclosure.

FIG. 4 is a schematic diagram of the operation processing module according to the present disclosure. In the step S3, a corresponding result of the N-point FFT is obtained by performing operation processing according to formula (4), formula (5), formula (6), and formula (7), where $y_1(m)$ corresponds to bits 1 to N/4 of the result of the N-point FFT in sequence, $y_2(m)$ corresponds to bits N/4+1 to N/2 of the result of the N-point FFT in sequence, $y_3(m)$ corresponds to bits N/2+1 to 3N/4 of the result of the N-point FFT in sequence, and $y_4(m)$ corresponds to bits 3N/4+1 to N of the result of the N-point FFT in sequence;

$$y_1(m) = z_1(m) + e^{-j\frac{2\pi}{N/2}m}z_2(m) + e^{-j\frac{2\pi}{N}m}\left(z_3(m) + e^{-j\frac{2\pi}{N/2}m}z_4(m)\right)m = 0, \tag{4}$$

-continued $$1, \ldots, \frac{N}{4} - 1;$$

$$y_2(m) = \tag{5}$$

$$z_1(m) - e^{-j\frac{2\pi}{N/2}m}z_2(m) + e^{-j\frac{2\pi}{N}\left(m+\frac{N}{4}\right)}\left(z_3(m) - e^{-j\frac{2\pi}{N/2}m}z_4(m)\right)m = 0,$$

$$1, \ldots, \frac{N}{4} - 1;$$

$$y_3(m) = z_1(m) + e^{-j\frac{2\pi}{N/2}m}z_2(m) - e^{-j\frac{2\pi}{N}m}\left(z_3(m) + e^{-j\frac{2\pi}{N/2}m}z_4(m)\right)m = 0, \tag{6}$$

$$1, \ldots, \frac{N}{4} - 1;$$

$$y_4(m) = \tag{7}$$

$$z_1(m) - e^{-j\frac{2\pi}{N/2}m}z_2(m) - e^{-j\frac{2\pi}{N}\left(m+\frac{N}{4}\right)}\left(z_3(m) - e^{-j\frac{2\pi}{N/2}m}z_4(m)\right)m = 0,$$

$$1, \ldots, \frac{N}{4} - 1;$$

The step S3 further includes substep S31-S36.

Substep S31: a delay beating is performed on the sequences $z_2(m)$ and $z_4(m)$ to wait for the twiddle factor data of WN3; and the sequences $z_2(m)$ and $z_4(m)$ are multiplied by the twiddle factor data of WN3 in sequence in a pipeline architecture to obtain sequences $z_{21}(m)$ and $z_{41}(m)$ having a length of N/4, where m=0, 1, . . . , N/4−1.

Substep S32: the delay beating is performed on the sequences $z_1(m)$ and $z_3(m)$ to wait for $z_{21}(m)$ and $z_{41}(m)$; $z_1(m)$ and $z_{21}(m)$ are added in sequence in the pipeline architecture to obtain a sequence $z_1(m)$ having a length of N/4, where m=0, 1, . . . , N/4−1; a subtraction operation is performed on $z_1(m)$ and $z_{21}(m)$ in sequence in the pipeline architecture, i.e., $z_{21}(m)$ is subtracted from $z_1(m)$ to obtain a sequence $z_2(m)$ having a length of N/4, where m=0, 1, . . . , N/4−1; $z_3(m)$ and $z_{41}(m)$ are added in sequence in the pipeline architecture to obtain a sequence $z_3(m)$ having a length of N/4, where m=0, 1, . . . , N/4−1; and a subtraction operation is performed on $z_3(m)$ and $z_{41}(m)$ in sequence in the pipeline architecture, i.e., $z_{41}(m)$ is subtracted from $z_3(m)$ to obtain a sequence $z_4(m)$ having a length of N/4, where m=0, 1, . . . , N/4−1.

Substep S33: a data valid signal data2_valid is output synchronously to the twiddle factor storage module while $Z_3(m)$ and $Z_4(m)$ are obtained, which is valid at a high level.

Substep S34: the delay beating is performed on the sequences $Z_3(m)$ and $Z_4(m)$ to wait for the twiddle factor data of WN1 and the twiddle factor data of WN2; the sequence $Z_3(m)$ and the twiddle factor data of WN1 are multiplied in sequence in the pipeline architecture to obtain a sequence $Z_{31}(m)$ having a length of N/4, where m=0, 1, . . . , N/4−1; and the sequence $Z_4(m)$ and the twiddle factor data of WN2 are multiplied in sequence in the pipeline architecture to obtain a sequence $Z_{41}(m)$ having a length of N/4, where m=0, 1, . . . , N/4−1.

Substep S35: the delay beating is performed on the sequences $Z_1(m)$ and $Z_2(m)$ to wait for $Z_{31}(m)$ and $Z_{41}(m)$; the sequences $Z_1(m)$ and $Z_{31}(m)$ are added in sequence in the pipeline architecture to obtain a sequence $y_1(n)$ having a length of N/4, where n=0, 1, . . . , N/4–1; the sequences $Z_2(m)$ and $Z_{41}(m)$ are added in sequence in the pipeline architecture to obtain a sequence $y_2$ (n) having a length of N/4, where n=0, 1, . . . , N/4–1; a subtraction operation is performed on the sequences $Z_1(m)$ and $Z_{31}(m)$ in sequence in the pipeline architecture, i.e., $Z_{31}(m)$ is subtracted from $Z_1(m)$ to obtain a sequence $y_3(n)$ having a length of N/4, where n=0, 1, . . . , N/4–1; and a subtraction operation is performed on the sequences $Z_2(m)$ and $Z_{41}(m)$ in sequence in the pipeline architecture, i.e., $Z_{41}(m)$ is subtracted from $Z_2(m)$ to obtain a sequence $y_4(n)$ having a length of N/4, where n=0, 1, . . . , N/4–1.

Substep S36: a data valid signal dout_valid is output synchronously while $y_1(m)$, $y_2(m)$, $y_3(m)$, and $y_4(m)$ are output, which is valid at a high level.

The above are the specific implementation steps explained by the inventor in conjunction with the examples, and the present disclosure is applicable to a digital baseband module and a digital image processing module of an FPGA-based communication system. It should be pointed out that those skilled in the art could improve and perfect the method without departing from the present disclosure, but it should be understood that the above examples do not impose restrictions on the protection scope of the present disclosure, and any improvement and perfection based on the present disclosure should fall within the protection scope of the present disclosure.

What is claimed is:

1. A method for accelerating fast Fourier transform based on field-programmable gate array (FPGA), wherein the FPGA is internally provided with a fast Fourier transform (FFT) decomposition module, a twiddle factor storage module, and an operation processing module; and the method comprises:

step S1: decomposing, by the FFT decomposition module, an input sequence having a length of N into 4 subsequences having a length of N/4, and synchronously performing N/4-point FFT;

step S2: outputting, by the twiddle factor storage module, pre-stored twiddle factor data by determining an external input signal for performing arithmetic operation; and step S3: processing, by the operation processing module, data output by the FFT decomposition module and the twiddle factor storage module to obtain a result of N-point FFT of an original sequence;

wherein the FFT decomposition module comprises a sequence decomposition module and four parallel N/4-point FFT submodules, wherein the N/4-point FFT submodules are FFT intellectual property (IP) cores provided by the FPGA, with an output mode of sequential output;

the twiddle factor storage module comprises two control units respectively marked as ctrl and ctr2, and three independent single-port block random access memories (BRAMs) respectively configured to store three different types of twiddle factor data; the three independent single-port BRAMs respectively have a depth of N/4 and are respectively marked as BRAM1, BRAM2, and BRAM3; and corresponding twiddle factor data stored in the three independent single-port BRAMs are as follows:

$$WN1 = e^{-j\frac{2\pi}{N}k}k = 0, 1 \ldots , \frac{N}{4} - 1; \qquad (1)$$

-continued $$WN2 = e^{-j\frac{2\pi}{N}k}k = \frac{N}{4}, \frac{N}{4} + 1, \ldots , \frac{N}{2} - 1; \qquad (2)$$

and $$WN3 = e^{-j\frac{2\pi}{N/2}k}k = 0, 1 \ldots \frac{N}{4} - 1; \qquad (3)$$

wherein the step S1 comprises:

substep S11: upon determining that a signal fft_valid==1, decomposing the input sequence x(n) having the length of N into the 4 subsequences, x(m), x(m+2), x(m+1), and x(m+3), each having the length of N/4, wherein n=0, 1, . . . , N–1, and m=0, 1, . . . , N/4–1;

substep S12: transforming the 4 subsequences x(m), x(m+2), x(m+1), and x(m+3) through four parallel N/4-point FFT IP cores respectively, to obtain 4 output sequences $z_1(m)$, $z_2(m)$, $z_3(m)$, and $z_4(m)$, wherein m=0, 1, . . . , N/4–1; $z_1(m)$ corresponds to an output of x(m), $z_2(m)$ corresponds to an output of x(m+2), $z_3(m)$ corresponds to an output of x(m+1), and $z_4(m)$ corresponds to an output of x(m+3); and substep S13: outputting synchronously a data valid signal data1_valid to the twiddle factor storage module while outputting the sequences $z_1(m)$, $z_2(m)$, $z_3(m)$, and $z_4(m)$.

2. The method for accelerating the fast Fourier transform based on the FPGA according to claim 1, wherein the step S2 further comprises:

substep S21: sequentially storing corresponding twiddle factors into three independent memory cells BRAM1, BRAM2, and BRAM3 in a binary form according to an increasing order of k values;

substep S22: when the control unit ctrl determines that the signal data1_valid==1, generating a read enable signal rd1 and a read address counter addr1 of BRAM3, sequentially acquiring the twiddle factor data of WN3, and transmitting the twiddle factor data of WN3 to the operation processing module; and substep S23: when the control unit ctr2 determines that a signal data2_valid==1, generating a read enable signal rd2 and a read address counter addr2 of BRAM1 and BRAM2, sequentially acquiring the twiddle factor data of WN1 and WN2, and transmitting the twiddle factor data of WN1 and WN2 to the operation processing module.

3. The method for accelerating the fast Fourier transform based on the FPGA according to claim 1, wherein step S3 further comprises:

substep S31: performing a delay beating on the sequences $z_2(m)$ and $z_4(m)$ to wait for the twiddle factor data of WN3; and multiplying the sequences $z_2(m)$ and $z_4(m)$ by the twiddle factor data of WN3 in sequence in a pipeline architecture to obtain sequences $z_{21}(m)$ and $z_{41}(m)$ having a length of N/4, wherein m=0, 1, . . . , N/4–1;

substep S32: performing the delay beating on the sequences $z_1(m)$ and $z_3(m)$ to wait for $z_{21}(m)$ and $z_{41}(m)$; adding $z_1(m)$ and $z_{21}(m)$ in sequence in the pipeline architecture to obtain a sequence $Z_1(m)$ having a length of N/4, wherein m=0, 1, . . . , N/4–1; performing a subtraction operation on $z_1(m)$ and $z_{21}(m)$ in sequence in the pipeline architecture, by subtracting $z_{21}(m)$ from $z_1(m)$ to obtain a sequence $Z_2(m)$ having a length of N/4, wherein m=0, 1, . . . , N/4–1; adding $z_3(m)$ and $z_{41}(m)$ in sequence in the pipeline architecture to obtain a sequence $z_3(m)$ having a length of N/4, wherein $m=0, 1, \ldots, N/4-1$; and performing a subtraction operation on $z_3(m)$ and $z_{41}(m)$ in sequence in the pipeline architecture, by subtracting $z_{41}(m)$ from $z_3(m)$ to obtain a sequence $Z_4(m)$ having a length of $N/4$, wherein $m=0, 1, \ldots, N/4-1$;

substep S33: outputting synchronously a data valid signal data2_valid to the twiddle factor storage module while obtaining $Z_3(m)$ and $Z_4(m)$;

substep S34: performing the delay beating on the sequences $Z_3(m)$ and $Z_4(m)$ to wait for the twiddle factor data of WN1 and the twiddle factor data of WN2; multiplying the sequence $Z_3(m)$ and the twiddle factor data of WN1 in sequence in the pipeline architecture to obtain a sequence $Z_{31}(m)$ having a length of $N/4$, wherein $m=0, 1, \ldots, N/4-1$; and multiplying the sequence $Z_4(m)$ and the twiddle factor data of WN2 in sequence in the pipeline architecture to obtain a sequence $Z_{41}(m)$ having a length of $N/4$, wherein $m=0, 1, \ldots, N/4-1$;

substep S35: performing the delay beating on the sequences $Z_1(m)$ and $Z_2(m)$ to wait for $Z_{31}(m)$ and $Z_{41}(m)$; adding the sequences $Z_1(m)$ and $Z_{31}(m)$ in sequence in the pipeline architecture to obtain a sequence $y_1(n)$ having a length of $N/4$, wherein $n=0, 1, \ldots, N/4-1$; adding the sequences $Z_2(m)$ and $Z_{41}(m)$ in sequence in the pipeline architecture to obtain a sequence $y_2(n)$ having a length of $N/4$, wherein $n=0, 1, \ldots, N/4-1$; performing a subtraction operation on the sequences $Z_1(m)$ and $Z_{31}(m)$ in sequence in the pipeline architecture, by subtracting $Z_{31}(m)$ from $Z_1(m)$ to obtain a sequence $y_3(n)$ having a length of $N/4$, wherein $n=0, 1, \ldots, N/4-1$; and performing a subtraction operation on the sequences $Z_2(m)$ and $Z_{41}(m)$ in sequence in the pipeline architecture, by subtracting $Z_{41}(m)$ from $Z_2(m)$ to obtain a sequence $y_4(n)$ having a length of $N/4$, wherein $n=0, 1, \ldots, N/4-1$; and substep S36: outputting synchronously a data valid signal dout_valid while outputting $y_1(m)$, $y_2(m)$, $y_3(m)$, and $y_4(m)$.

\* \* \* \* \*